No. 711,559. Patented Oct. 21, 1902.
F. H. ENGELS.
WATER HEATER.
(Application filed Apr. 12, 1902.)

(No Model.) 2 Sheets—Sheet 1.

Witnesses
C. H. Walker
F. E. Rapp

Inventor
Frank H. Engels
by Frank S. Appleman
Attorney

THE NORRIS PETERS CO., PHOTO-LITHO., WASHINGTON, D. C.

No. 711,559. Patented Oct. 21, 1902.
F. H. ENGELS.
WATER HEATER.
(Application filed Apr. 12, 1902.)
(No Model.) 2 Sheets—Sheet 2.
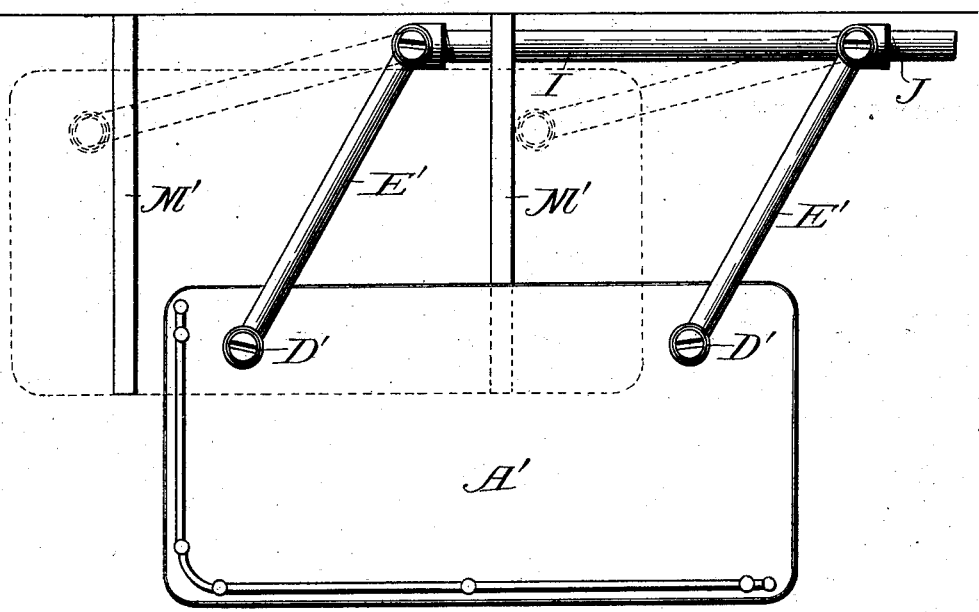
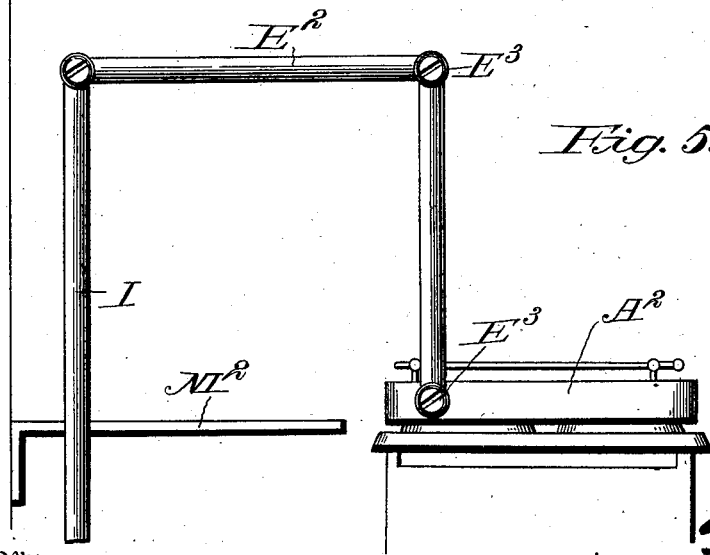

UNITED STATES PATENT OFFICE.

FRANK H. ENGELS, OF BARNESVILLE, MINNESOTA.

WATER-HEATER.

SPECIFICATION forming part of Letters Patent No. 711,559, dated October 21, 1902.

Application filed April 12, 1902. Serial No. 102,549. (No model.)

*To all whom it may concern:*

Be it known that I, FRANK H. ENGELS, a citizen of the United States of America, residing at Barnesville, in the county of Clay and State of Minnesota, have invented certain new and useful Improvements in Water-Heaters, of which the following is a specification.

This invention relates to heating devices, and is designed for use in utilizing heat which is ordinarily wasted, especially in ranges and other cooking-stoves.

The object of this invention is the production of a combined water-heater and warming-shelf, which is attached to a cooking-stove or stationed in relation thereto that it may be utilized in connection therewith. It also is my purpose to employ the heating device in connection with gas or vapor stoves.

Furthermore, the object of the invention is to provide a heating device which has novel hinged connections leading to a tank, whereby water may circulate from the tank to the heater and return to the tank.

Furthermore, the object of the invention is to provide means whereby the heating device may be supported in a horizontal position in any given plane (within certain bounds) with relation to the heating-surface of the stove. Thus the heating device may be supported horizontally on brackets on a plane above or below the surface of the stove and utilized to hold cooking utensils for the purpose of keeping the contents warm.

A still further object of the invention is to produce a heating device of the character noted which will possess advantages in points of utility, efficiency, and durability, proving at the same time comparatively inexpensive.

With the foregoing and other objects in view the invention consists in the details of construction and in the arrangement and combination of parts to be hereinafter more fully set forth and claimed.

In describing the invention in detail reference will be had to the accompanying drawings, forming part of the specification, wherein like characters denote corresponding parts in the several views, and in which—

Figure 1:
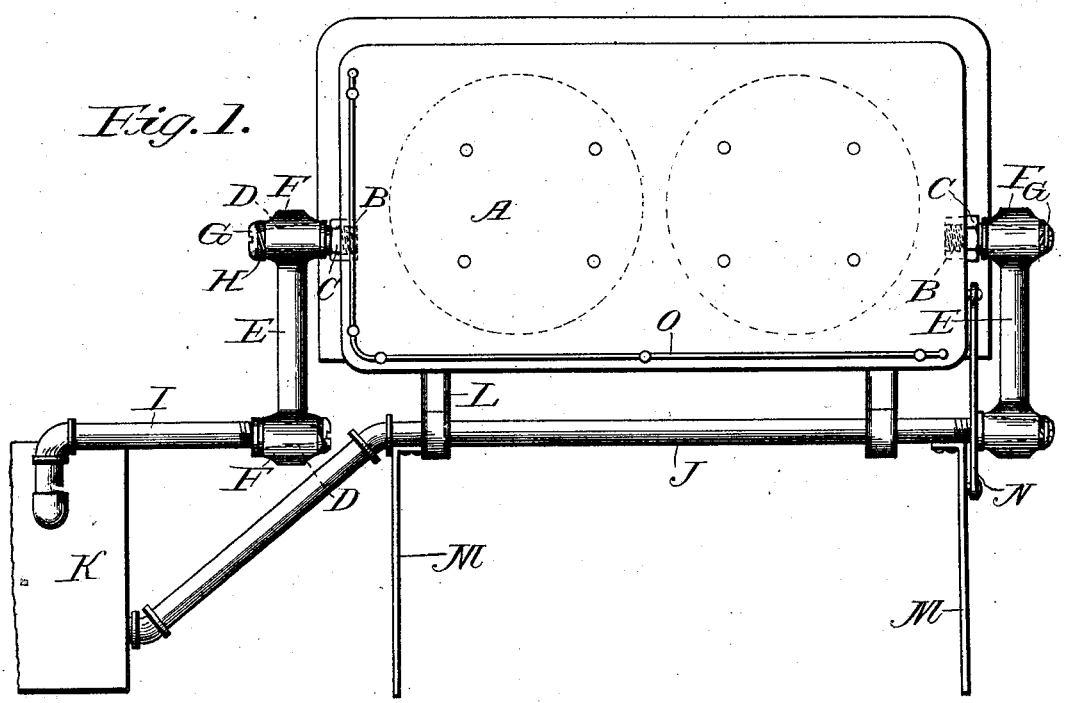
Figure 2:
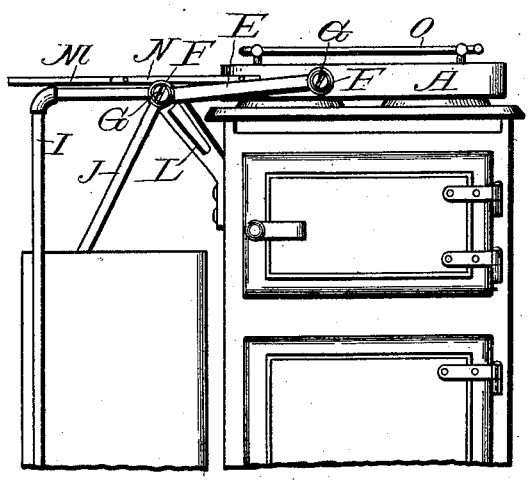
Figure 3:
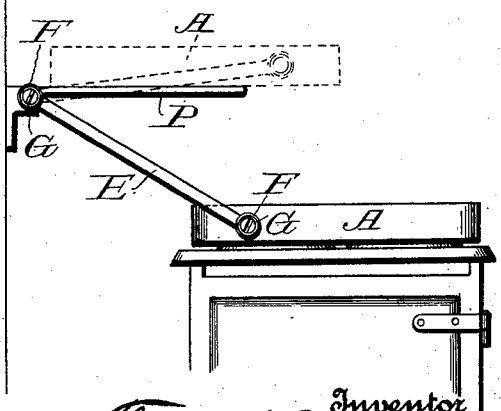

Figure 1 is a plan view of the heater and its connections. Fig. 2 is an end view of a stove with the heater applied. Fig. 3 is a similar view showing a modified supporting device. Fig. 4 is a plan view of a further modification. Fig. 5 is a view of another form in elevation.

In the drawings, A denotes the heater, comprising a shallow pan-like receptacle entirely inclosed and constructed of such material as to withstand a pressure of approximately one hundred and fifty pounds to the square inch. The ends of the heater have openings B, into which are threaded the shanks C of the valve-plugs D, which form pivots for the arms E. The arms E terminate in sleeves or valve-casings F, which fit on the plugs and are held thereon by the screws G, bearing against the springs H. The opposite ends of the arms have similar sleeves F, which fit on plugs D of circulating-pipes I and J, through which water passes to and from the heater and supply-tank K. The pipe J is supported by suitable brackets L, connected to the stove to which the heating system is attached. Brackets M are attached to the pipe J and extend therefrom in a direction opposite to the stove in order that the heater may rest thereon after it is swung from the heating surface of the stove. The connections between the sleeves of the arms and plugs are pivot-joints, which permit a free swing of the arms, while the heater is maintained in approximately horizontal position. When the heater is deposited on the brackets M, it is in a position to be utilized for supporting cooking utensils, the contents of which will be kept warm by reason of the hot water in the heater. Guide-arms N are pivoted to the ends of the heater and to the brackets for the purpose of steadying and preventing the pan-like receptacle from completely rotating on its pivots as it is transferred from one position to another. The handle-rail O is attached to posts secured to the upper surface of the heater. The handle may be of any length and when desired may continue around the upper surface of the heater.

In the modification shown in Fig. 3 the brackets P are attached to the pipe J and the pipe J in turn is secured to the wall at any desired height (within certain bounds) with relation to the stove. In this construction the plugs are tapped into the ends of the heater somewhat closer to the edge than is done with the device shown in Fig. 1. When the heater is to be placed on the brackets, it is swung over on its pivots and applied to the brackets, as shown, and as it is removed from the brackets it is turned back that its under surface may again rest on the heating-surface of the stove.

In Fig. 4 the heater A' has the valve-plugs D', tapped in the top, and the arms E', as heretofore described in connection with Fig. 1, are pivoted on the plugs D', standing vertically from the pipes I and J. By this arrangement the arms swing horizontally and carry the heater in a horizontal plane back of the stove to the brackets M', or, if desired, the brackets may be omitted and the heater may be supported by the arms.

In Fig. 5 the arm $E^2$ has a joint $E^3$ intermediately its length, while the ends are pivoted on the plugs of the heater $A^2$ and the pipes I and J, similar to that shown in Fig. 1, except that the pipes I and J are on a higher plane and the jointed arms stand in the position shown in Fig. 5 when the heater is applied to the stove. In this arrangement of parts the heater is elevated and swung back to the brackets $M^2$, which may be at any elevation within certain bounds.

The construction, operation, and advantages will, it is thought, be understood from the foregoing description, it being noted that various changes may be made in the proportions and details of construction without departing from the scope of the invention.

Having fully described my invention, what I claim as new, and desire to secure by Letters Patent, is—

In a water-heater, a receptacle, hollow arms pivoted to and communicating with the receptacle, circulating-pipes to which the arms are pivoted and with which they communicate, brackets on one of the pipes in such relation to the receptacle as to permit the receptacle to be deposited thereon.

In testimony whereof I affix my signature, in the presence of two witnesses, this 24th day of March, 1902.

FRANK H. ENGELS.

Witnesses:
CHAS. S. MARDEN,
C. E. HODLAND.